United States Patent
Chung et al.

(10) Patent No.: US 6,930,135 B2
(45) Date of Patent: Aug. 16, 2005

(54) NON-PIGMENTED INK JET INKS

(75) Inventors: Chao-Jen Chung, North Wales, PA (US); Maureen Joanne Finley, Churchville, PA (US); Zhenwen Fu, Lansdale, PA (US); William David Sheasley, New Britain, PA (US)

(73) Assignee: Rohm and Haas Company, Philadelphia, PA (US)

( * ) Notice: Subject to any disclaimer, the term of this patent is extended or adjusted under 35 U.S.C. 154(b) by 195 days.

(21) Appl. No.: 10/375,775

(22) Filed: Feb. 27, 2003

(65) Prior Publication Data

US 2003/0176534 A1 Sep. 18, 2003

Related U.S. Application Data

(60) Provisional application No. 60/363,421, filed on Mar. 12, 2002.

(51) Int. Cl.$^7$ .............................. C09D 11/10; C08K 7/22
(52) U.S. Cl. .................. 523/160; 523/218; 106/409
(58) Field of Search ................... 523/160, 161, 523/218; 106/409; 524/556

(56) References Cited

U.S. PATENT DOCUMENTS

| | | | |
|---|---|---|---|
| 4,880,465 A | | 11/1989 | Loria et al. |
| 4,902,722 A | | 2/1990 | Melber |
| 5,596,027 A | | 1/1997 | Mead et al. |
| 6,174,938 B1 | * | 1/2001 | Miller et al. ................ 523/164 |
| 6,309,452 B1 | | 10/2001 | Beach et al. |
| 6,555,278 B1 | * | 4/2003 | Loveridge et al. ............. 430/7 |
| 6,666,913 B2 | * | 12/2003 | Hirano et al. .............. 106/31.9 |
| 2003/0149130 A1 | * | 8/2003 | Kondo ....................... 523/160 |

FOREIGN PATENT DOCUMENTS

| | | | |
|---|---|---|---|
| EP | 0286219 | | 12/1988 |
| GB | 2224737 A | * | 5/1990 |
| JP | 08-259862 | | 8/1996 |
| JP | 2000-103995 | | 4/2000 |
| JP | 2000-239585 | | 5/2000 |
| JP | 2001-131450 | | 5/2001 |
| JP | 2001-131451 | | 5/2001 |

* cited by examiner

*Primary Examiner*—Callie Shosho
(74) *Attorney, Agent, or Firm*—Karl E. Stauss

(57) ABSTRACT

A non-pigmented ink composition suitable for use in ink jet printing is provided made up of a blend of two or more hollow micro-spheres comprising a small particle size hollow micro-sphere and a larger particle size hollow microsphere. The remainder of the ink composition comprises a suitable carrier vehicle, which typically contains water, alcohols, surfactants, humectants and optionally a resin component.

8 Claims, No Drawings

NON-PIGMENTED INK JET INKS

CROSS REFERENCE TO RELATED PATENT APPLICATION

This is a non-provisional application of prior U.S. provisional application Ser. No. 60/363,421 filed on Mar. 12, 2002.

This invention relates to a non-pigmented ink jet ink. More specifically, this invention relates to an ink jet ink having a controlled hue comprising a blend of two or more hollow micro-spheres.

Ink jet printing is a well established technique for applying an ink to a substrate to form an image, in which there is no physical contact between the functional part of the printer from which the ink is applied and the substrate onto which the ink is deposited. The ink is applied in the form of micro-droplets, which are projected by well known means through small nozzles in the print head onto the substrate.

Inks useful for ink jet printing typically comprise a colorant, an optional resin component, a carrier fluid and various additives. The colorant may be pigment based or dye based. The resin component is used to fix the colorant on the substrate and improve properties, such as water resistance. The carrier fluid may be water, a solvent or a mixture of water and a miscible solvent. Additives are incorporated into the ink jet ink to confer certain performance properties. Such additives may include humectants to reduce the rate of drying of the ink at the nozzle tip; surfactants to control the surface tension and degree of wet out of the ink within the nozzle, on the nozzle plate, and on the substrate; volatile alcohols to speed the drying of the ink on the substrate; bases such as ammonia, fixed bases or organic amines to control pH and other additives as may be needed to provide good jettability performance in a given printer.

Pigments are desirable as colorants because of their light-fastness and water-fastness properties. Pigments are also more readily retained on the surface of porous substrates compared to soluble dyes. Soluble dyes are prone to be carried into the interior of porous substrates through the wicking action of the liquid and thereby suffer from reduced color intensity.

While colored inks containing various organic pigments are in widespread use in ink jet printing, there are very few white inks available. The primary reason is that the majority of white pigments are inorganic in nature, such as titanium dioxide, and have a specific gravity substantially greater than that of water. Therefore, in the dilute, low viscosity water medium of the ink required for ink jet inks, such inorganic pigments quickly settle out of the ink, and give rise to low and variable intensity on the printed image, and cause plugging of the nozzles in the ink jet print head.

U.S. Pat. No. 4,880,465 discloses the use of hollow micro-spheres in white ink jet inks. Such micro-spheres are sub-micron sized polymeric spheres with a central cavity within each particle. When these particles are present in the liquid ink, the center cavity is filled with water. After the ink has been jetted onto a substrate, the water evaporates out of the center cavity, and leaves a void filled with air. The size of this void is designed to effectively scatter visible light, so that the image produced appears white.

The use of hollow micro-spheres greatly alleviates the settling problems associated with inorganic pigments, because the hollow micro-spheres have a specific gravity close to that of water. Consequently, the uniformity of the white image, long term jettability, stability of the ink within the cartridge and the shelf life of the ink are all improved.

It is also well known in the theory of light scattering that the size of the scattering site has an influence on the wavelength of the light that is scattered. In the case of hollow micro-spheres, the center cavity or void is the scattering site. Within the scale of sizes relevant to the present subject of inks, the useful range of center void diameter is about 0.2 microns to about 1.5 micron. Smaller scattering sites preferentially scatter shorter wavelengths compared to larger scattering sites, which preferentially scatter longer wavelengths. Consequently, hollow micro-spheres with a cavity size at the smaller end of this range scatter short wavelengths preferentially, which thereby produce a white image with a bluish tint. Cavity sizes in the larger end of the useful range preferentially scatter wavelengths near the center of the visible spectrum, such that the obtained image is a more pure white.

The ability to impart a bluish undertone or hue to the white ink is an important feature in many applications using white ink. It is sufficiently important, in fact, that a specific measurement common in the paper industry has been defined in order to determine the level of short wavelength contribution, or bluish undertone, present in the scattered light. That measurement is known as brightness. In the present discussion, the level of bluish secondary tone exhibited by the white ink will be referred to as hue.

It is desirable in many cases when printing images to produce a white ink having a specific hue to enhance the aesthetic qualities of the overall image. To achieve this objective using U.S. Pat. No. 4,880,465, it is necessary to synthesize and manufacture a separate hollow micro-sphere having a specific void size for each hue desired in a white ink. This leads to a proliferation of hollow micro-sphere products that are needed. Moreover, the synthesis of very specific void sizes is a difficult task, leading to inefficient manufacturing operations.

The problem addressed by the present invention is to provide an ink composition with a controlled range of hue values. We have found that by providing a blend of hollow micro-spheres, differing in particle size or geometry, the range of hue values can be controlled.

The present invention provides a non-pigmented ink comprising a carrier liquid and a multi-modal blend of polymer particles, wherein each mode has a particle size of between 0.2 to 1.5 micron, at least one mode is a hollow micro-sphere polymer and at least two modes differ in particle size by at least 0.1 micron. The present invention further provides a method of ink jet ink printing, comprising: (a) providing a substrate and (b) imparting micro-droplets of an ink composition onto said substrate wherein said ink composition comprises a carrier liquid and a multi-modal blend of polymer particles, wherein each mode has a particle size of between 0.2 to 1.5 micron, at least one mode is a hollow micro-sphere polymer and at least two modes differ in particle size by at least 0.1 micron. The present invention further provides a method of controlling the hue of an ink, comprising: (a) preparing an ink composition comprising a carrier liquid and a multi-modal blend of polymer particles, wherein each mode has a particle size of between 0.2 to 1.5 micron, at least one mode is a hollow micro-sphere polymer and at least two modes differ in particle size by at least 0.1 micron; and (b) adjusting the ratio of modes to achieve a desired hue.

Surprisingly, the blending of two or more hollow micro-sphere components having very different cavity sizes or shapes makes it possible to accurately select any desired hue characteristic of a white ink, from a bluish hue to a pure white, as may be needed to produce the desired effect for a specific application. The capability to design a specific hue into the formulation by a simple weighing operation of two or more individual components makes possible a precise control of the ink's hue and also provides a simple manufacturing process.

A non-pigmented ink composition suitable for use in ink jet printing is provided made up of a multi-modal blend of two or more hollow micro-spheres comprising a small particle size hollow micro-sphere and a larger particle size hollow micro-sphere. The remainder of the ink composition comprises a suitable carrier vehicle, which typically contains water, alcohols, surfactants, humectants and optionally a resin component. Once the ink is deposited onto a substrate and the carrier vehicle is removed, a film of polymeric material remains on the substrate. The term "ink" (or variations of this term) as used herein means an ink which will provide a film upon removal of the carrier vehicle.

The term "multi-modal" means a composition comprising two or more polymer particles grouped around at least two different and distinct particle size distribution curves. Particle size is measured by either the UPA150 bench type particle size analyzer made by Microtrac Inc., 148 Keystone Drive, Montgomeryville, Pa. 18936, USA or the BI-90 particle size analyzer made by Brookhaven Instruments Corporation, 750 Blue Point Rd., Holtsville, N.Y. 11742, USA. Preferably, at least one mode is a hollow micro-sphere polymer. More preferably, the larger mode of a multi-modal composition is a hollow micro-sphere polymer. Most preferably, at least two modes of the multi-modal composition are hollow micro-sphere polymers.

The hollow micro-spheres described herein may be made by emulsion polymerization according to various procedures known in the art, including, without limitation, those described in U.S. Pat. Nos. 5,229,209, 4,594,363, 4,427,836 or 4,089,800, or as described in the Journal of Polymer Science—Part A, volume 39, pages 1435–1449 (2001), published by John Wiley and Sons, Inc. The means by which the cavity size is designed is described therein. The hollow micro-spheres produced therein contain surfactants according to conventional emulsion polymerization techniques, and are stable systems which, if synthesized according to good practice or filtered following completion of the synthesis procedure, consist of micro-sphere particles dispersed individually in the water medium. These products, therefore, do not require milling, grinding or other means to promote dispersion that are conventionally applied to organic pigments used in ink jet formulations.

Hollow micro-spheres may be polymerized using a variety of vinyl monomers as described in the above references. Examples of nonionic monoethylenically unsaturated monomers include styrene, vinyltoluene, ethylene, vinyl acetate, vinyl chloride, vinylidene chloride, acrylonitrile, (meth) acrylamide, various ($C_1$–$C_{20}$) alkyl or ($C_3$–$C_{20}$) alkenyl esters of (meth)acrylic acid, including methyl acrylate (MA), methyl methacrylate (MMA), ethyl acrylate (EA) and butyl acrylate (BA). The expression (meth)acrylic acid is intended to serve as a generic expression embracing both acrylic acid and methacrylic acid, and may be used with acrylic esters as, for example, methyl methacrylate (MMA), methyl acrylate (MA), ethyl (meth)acrylate (EMA), butyl (meth)acrylate (BMA), 2-hydroxyethyl methacrylate (HEMA), 2-ethylhexyl (meth)acrylate (EHMA), benzyl (meth)acrylate, lauryl (meth)acrylate, oleyl (meth)acrylate, palmityl (meth)acrylate, and stearyl (meth)acrylate.

Typically acrylic esters such as MMA, EA, BA and styrene are preferred monomers to polymerize and form the shell of the micro-spheres. Difunctional vinyl monomers, such as divinyl benzene, allyl methacrylate, ethylene glycol dimethacrylate, 1,3-butane-diol dimethacrylate, diethylene glycol dimethacrylate, trimethylol propane trimethacrylate, and the like, may also be copolymerized to form a crosslinked outer shell. These compositions of the hollow micro-spheres represent conventional embodiments of this class of material, but the invention described herein is not limited to these compositions.

The glass transition temperature ("Tg") of the polymeric particles is typically from –50° C. to 150° C., the monomers and amounts of the monomers selected to achieve the desired polymer Tg range being well known in the art. Typical Tg values for hollow micro-spheres are greater than 70° C. "Glass transition temperature" or "$T_g$" as used herein, means the temperature at or above which a glassy polymer will undergo segmental motion of the polymer chain. Glass transition temperatures of a polymer can be estimated by the Fox equation [Bulletin of the American Physical Society 1, 3, page 123 (1956)] as follows:

$$\frac{1}{T_g} = \frac{w_1}{T_{g(1)}} + \frac{w_2}{T_{g(2)}}$$

For a copolymer of monomers $M_1$ and $M_2$, $w_1$ and $w_2$ refer to the weight fraction of the two co-monomers, and $T_{g(1)}$ and $T_{g(2)}$ refer to the glass transition temperatures of the two corresponding homopolymers in degrees Kelvin. For polymers containing three or more monomers, additional terms are added ($w_n/T_{g(n)}$). The $T_g$ of a polymer can also be measured by various techniques including, for example, differential scanning calorimetry ("DSC"). The particular values of $T_g$ reported herein are calculated based on the Fox equation. The glass transition temperatures of homopolymers may be found, for example, in "Polymer Handbook", edited by J. Brandrup and E. H. Immergut, Interscience Publishers.

Inks of the present invention comprising a blend of two or more hollow micro-spheres having different cavity sizes, may be formulated by simple blending in a conventional low shear mixing apparatus. Other well known mixing techniques or ink formulating techniques may be employed to prepare inks of the present invention. Such inks may comprise up to sixty percent (60%) by weight of the combined hollow micro-spheres.

As described above, additives may be incorporated into the ink jet ink to confer certain performance properties. Typical humectants that may be incorporated in inks of the present invention include, without limitation, ethylene glycol, diethylene glycol, propylene glycol, N-methyl-2-pyrrolidone, and any other known humectant. Typical anionic surfactants that may be incorporated in inks of the present invention include, without limitation, sulfates, sulfonates, carboxylates, phosphates and any other known surfactant. Typical non-ionic surfactants that may be incorporated in inks of the present invention include, without limitation, alkyl phenyl polyethylene oxides, alkyl polyethylene oxides, polyethylene oxide esters, polyethylene oxide adducts of acetylene glycol and any other known surfactant. Typical bases that may be incorporated in inks of the present invention include, without limitation, ammonia; fixed bases such as NaOH, KOH, LiOH; amines such as diethanol amine, triethanolamine and any other known base to control pH.

Resins, including, without limitation, thermoplastic and crosslinkable resins, may be incorporated into the ink jet ink to provide binding capability in the dried ink film. The binding of hollow micro-spheres in the dried ink will lead to improved water and smear resistance. The resins may be water-dispersed polymers, such as may be produced by conventional emulsion polymerization, or water-soluble resins. Useful resin components include, without limitation, copolymers of acrylic acid esters or methacrylic acid esters, copolymers of styrene and acrylic or methacrylic acid esters, copolymers of styrene and acrylic acid, styrene-butadiene copolymers, copolymers of vinyl acetate with other acrylic or methacrylic acid esters, and the like.

Inks of the present invention may be applied to any known substrate, including, without limitation, paper, paperboard, textiles, natural and synthetic substrates, plastics, glass and ceramics. Inks of the present invention may be applied by any known type of printing device, including, without limitation, thermal ink jets, piezoelectric ink jets, continuous ink jets, roller applications and spray applications.

The invention in some of its embodiments will now be further described by reference to the following examples:

EXAMPLE 1

Ink Preparation

Ink compositions F1–F7 are formulated by combining the ingredients shown in Table 1 below. Units are expressed as a weight percentage of the ingredient in the final ink formulation.

TABLE 1

Ink formulations of blended size voided particle pigments.

| ID | HSP-1 | HSP-2 | Binder | NMP | PEG-600 | PPD | DI water | Total |
|----|-------|-------|--------|------|---------|-------|----------|--------|
| F1 | 48.14 | 0.00  | 15.48  | 6.50 | 3.00    | 10.20 | 16.68    | 100.00 |
| F2 | 43.33 | 5.10  | 15.48  | 6.50 | 3.00    | 10.20 | 16.39    | 100.00 |
| F3 | 33.70 | 15.29 | 15.48  | 6.50 | 3.00    | 10.20 | 15.83    | 100.00 |
| F4 | 24.07 | 25.49 | 15.48  | 6.50 | 3.00    | 10.20 | 15.26    | 100.00 |
| F5 | 14.44 | 35.68 | 15.48  | 6.50 | 3.00    | 10.20 | 14.70    | 100.00 |
| F6 | 4.81  | 45.88 | 15.48  | 6.50 | 3.00    | 10.20 | 14.13    | 100.00 |
| F7 | 0.00  | 50.98 | 15.48  | 6.50 | 3.00    | 10.20 | 13.84    | 100.00 |

HSP-1 is a small particle size hollow micro-sphere with an inner diameter of 210 nm and an outer diameter of 320 nm, with a solids content of 27%. HSP-2 is a large particle size hollow micro-sphere with an inner diameter of 700 nm and an outer diameter of 900 nm, with a solids content of 25.5%. HSP-1 and HSP-2 are prepared according to the description of preparing a hollow micro-sphere shown in European Patent Application Number 1 092 421 A2, published Apr. 18, 2001 and owned by the Rohm and Haas Company. NMP is 1-methyl-2-pyrrolidinone and is available from Acros Organics, New Jersey, U.S.A. PEG-600 is polyethylene glycol, molecular weight 600, available from Fisher Scientific. PPD is 1,3-propanediol, available from Acros Organics, New Jersey, U.S.A.

The binder is prepared by the following procedure: A 5-liter round-bottomed flask is equipped with paddle stirrer, thermometer, nitrogen inlet and reflux condenser. To 814.5 g. of deionized water heated to 75° C. in the flask under a nitrogen atmosphere with stirring there is added 10.5 g. of 0.1% $FeSO_4 \cdot 7H_2O$ followed by 105 g. of monomer emulsion. The monomer emulsion is prepared from 420 g. of deionized water, 150 g. of Triton X-405 (available from Rohm and Haas Company, Philadelphia, Pa., USA), 538.8 g. of butyl acrylate, 799.8 g. of ethyl acrylate, 73.65 g. of acrylonitrile, 87.75 g. of n-methylolacrylamide (48%) and 13.27 g. of acrylamide dissolved in 13.27 g. of deionized water. Three quarter grams of ammonium persulfate dissolved in 22.5 g. of water is added to the flask and then 0.6 g. of sodium bisulfite and 0.15 g. of sodium hydrosulfite dissolved in 22.5 g. of water. Two minutes later, the remaining monomer emulsion with addition of 15 g. itaconic acid dissolved in 300 g. of water is added to the kettle over a 90 minute period at 73° C. During the feed time, 6.75 g. of ammonium persulfate dissolved in 75 g. of water and 6.75 g. of sodium bisulfite dissolved in 75 g. of water are also added to the kettle. Thirty minutes after the monomer addition, 4.28 g. of t-butyl hydroperoxide (70%) dissolved in 48.25 g. of water and 2.145 g. of sodium formaldehyde sulfoxylate dissolved in 55.5 g. of water are added to the kettle over a 15 minute period. Thirty minutes after the addition, 4.28 g. of t-butyl hydroperoxide (70%) dissolved in 48.25 g. of water and 2.92 g. of isoascorbic acid dissolved in 55.5 g. of water are added to the kettle over a 30 minute period. The dispersion is then neutralized with 3.0 g. of 14% ammonia at a temperature below 45° C.

The properties of inks F1 to F7 are presented in Table 2.

TABLE 2

Ink properties.

| ID | pH | Surface Tension (dyne/cm) | Viscosity (cp) |
|----|------|------|------|
| F1 | 8.50 | 41.3 | 6.26 |
| F2 | 8.68 | 39.7 | 6.39 |
| F3 | 8.74 | 39.9 | 6.76 |
| F4 | 8.52 | 39.3 | 7.52 |
| F5 | 8.67 | 39.1 | 7.65 |
| F6 | 9.17 | 38.9 | 8.03 |
| F7 | 8.40 | 38.1 | 8.31 |

EXAMPLE 2

Substrate Printing and Color Measurement

Ink compositions prepared according to Example 1 are applied to fabric using an Epson 3000 printer. Five passes through the printer are used to provide an applied wet coating weight of 5.0–6.0 grams/ft$^2$.

L a b values are measured with a ColorQUEST™ CQ Sphere spectrometer, made by HunterLab, using the C light and a 2 degree measurement angle. The L value is relative measure of the degree of whiteness/blackness on a scale from 0–100 (0=black, 100=white). The a values indicate degree of redness/greenness. A positive a value indicates increasing redness. The b values are an indication of yellowness/blueness. A positive b value indicates increasing yellowness.

Table 3 presents results of printing ink compositions F1–F7 on a black 100% cotton fabric tee shirt by Gildan, available at Bodek and Rhodes Printable Tee Shirts and Sportswear since 1939 in Philadelphia, Pa., USA. Table 4 presents similar results for printing on a black 50% cotton/50% polyester fabric tee shirt by Gildan, available at Bodek and Rhodes Printable Tee Shirts and Sportswear since 1939 in Philadelphia, Pa., USA. Data are presented for prints with ambient drying and for prints after curing the inks at 150° C. for 3 minutes.

TABLE 3

L a b values of printed samples on 100% cotton.

| | Before Cure On Cotton | | | After Cure On Cotton | | |
|---|---|---|---|---|---|---|
| ID | L | A | b | L | a | b |
| F1 | 41.00 | −1.10 | −5.81 | 40.48 | −1.08 | −5.48 |
| F2 | 39.33 | −1.04 | −5.42 | 38.59 | −1.01 | −4.94 |
| F3 | 37.02 | −0.95 | −4.72 | 38.05 | −0.88 | −4.52 |
| F4 | 38.65 | −0.73 | −4.05 | 37.82 | −0.69 | −3.82 |
| F5 | 37.23 | −0.51 | −2.92 | 37.52 | −0.49 | −2.87 |
| F6 | 40.31 | −0.39 | −1.26 | 41.05 | −0.43 | −1.34 |
| F7 | 47.94 | −0.50 | −0.28 | 47.16 | −0.53 | −0.42 |

TABLE 4

L a b values of printed samples on 50% cotton :50% polyester blend.

| | Before Cure On Blend | | | After Cure On Blend | | |
|---|---|---|---|---|---|---|
| ID | L | A | b | L | a | b |
| F1 | 41.53 | −1.16 | −5.48 | 39.65 | −1.08 | −4.73 |
| F2 | 41.48 | −1.14 | −5.43 | 40.48 | −1.07 | −4.92 |
| F3 | 36.22 | −1.06 | −4.66 | 36.28 | −1.05 | −4.39 |
| F4 | 38.50 | −0.70 | −4.00 | 37.22 | −0.77 | −3.53 |
| F5 | 39.13 | −0.50 | −2.87 | 39.31 | −0.51 | −2.75 |
| F6 | 41.07 | −0.48 | −1.54 | 41.02 | −0.45 | −1.69 |
| F7 | 46.19 | −0.50 | −0.39 | 45.57 | −0.53 | −0.47 |

The hue, or bluish contribution to the white image, as represented by the b value in the L a b methodology for color measurement, varies in a systematic and controllable fashion as the proportion of small to large particle size hollow micro-sphere blend ratio is changed.

We claim:

1. A non-pigmented ink consisting essentially of a carrier liquid and a multi-modal blend of polymer particles, wherein each mode has a particle size of between 0.2 to 1.5 micron, at least two modes comprise a hollow micro-sphere polymer and and differ in particle size by at least 0.1 micron.

2. The ink of claim 1 wherein after printing on a black textile substrate, exhibits an "L" value of at least 35.

3. The ink of claim 1 wherein after printing on a black textile substrate, exhibits a "b" value of less than negative 0.3 (−0.3) and greater than negative 6.0 (−6.0).

4. The ink of claim 1 wherein the carrier liquid comprises water, an alcohol, a surfactant, a humectant and an optional resin.

5. The ink of claim 1 wherein the combined hollow micro-spheres constitute up to sixty percent (60%) by weight of the ink composition.

6. The ink of claim 1 wherein the ink composition is suitable for use in ink jet printing.

7. A method of ink jet ink printing, comprising:

a. providing a substrate;

b. imparting micro-droplets of a non pigmented ink composition onto said substrate wherein said ink composition consists essentially of a carrier liquid and a multi-modal blend of polymer particles, wherein each mode has a particle size of between 0.2 to 1.5 micron, at least two modes comprise a hollow micro-sphere polymer and differ in particle size by at least 0.1 micron.

8. A method of controlling the hue of an ink, comprising:

a. preparing a non pigmented ink composition consisting essentially of a carrier liquid and a multi-modal blend of polymer particles, wherein each mode has a particle size of between 0.2 to 1.5 micron, at least two modes comprise a hollow micro-sphere polymer and differ in particle size by at least 0.1 micron; and b. adjusting the ratio of modes to achieve a desired hue.

* * * * *